United States Patent
Izumi et al.

(10) Patent No.: US 7,558,660 B2
(45) Date of Patent: Jul. 7, 2009

(54) CONTINUOUSLY VARIABLE TRANSMISSION AND CONTROL METHOD THEREOF

(75) Inventors: Tetsuya Izumi, Yokohama (JP); Hironori Nihei, Zama (JP); Seonjae Kim, Seoul (KR); Takeshi Chibahara, Ichikawa (JP); Toru Koga, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 460 days.

(21) Appl. No.: 11/540,518

(22) Filed: Oct. 2, 2006

(65) Prior Publication Data
US 2007/0082771 A1 Apr. 12, 2007

(30) Foreign Application Priority Data
Oct. 4, 2005 (JP) ............................. 2005-290911

(51) Int. Cl.
*G06F 17/00* (2006.01)
(52) U.S. Cl. ............................. 701/51; 477/38; 477/45
(58) Field of Classification Search .................. 701/51, 701/52, 53, 54; 477/37, 44, 45, 46, 49, 50, 477/38
See application file for complete search history.

(56) References Cited

U.S. PATENT DOCUMENTS

| | | | |
|---|---|---|---|
| 7,039,516 B2 * | 5/2006 | Yamaguchi et al. | 701/51 |
| 7,387,589 B2 * | 6/2008 | Suzuki et al. | 477/46 |
| 7,493,203 B2 * | 2/2009 | Bitzer et al. | 701/51 |

FOREIGN PATENT DOCUMENTS

| | | |
|---|---|---|
| JP | 62-071032 U | 5/1987 |
| JP | 2004-100736 A | 4/2004 |

* cited by examiner

*Primary Examiner*—Richard M. Camby
(74) *Attorney, Agent, or Firm*—Foley & Lardner LLP (57) ABSTRACT

When a line pressure PL serving as a source pressure of a primary pulley (2) and a secondary pulley (3) is controlled on the basis of a control deviation ΔStep, which is the deviation between a step count StepMdl of a step motor (27) corresponding to a target speed ratio I (o) and a value obtained by adding a target deviation GTstep and a starting learned value Gstep to a step count Bstep of the step motor (27) corresponding to an actual speed ratio ip, the engine torque varies dramatically beyond the range of a predetermined value T1 and a predetermined value T2 during a predetermined time period t1, a learning error determination relating to the starting learned value Gstep is prohibited for a predetermined time period t2.

6 Claims, 4 Drawing Sheets

CONTINUOUSLY VARIABLE TRANSMISSION AND CONTROL METHOD THEREOF

FIELD OF THE INVENTION

This invention relates to a line pressure control for a continuously variable transmission.

BACKGROUND OF THE INVENTION

A continuously variable transmission performs power transmission by means of a V belt, for example, which is wrapped around a primary pulley into which an engine rotation is input and a secondary pulley on an output side which engages with a vehicle wheel.

In a continuously variable transmission, the step count of a step motor is controlled to realize a target speed ratio, and as a result, the pressure of the primary pulley is controlled such that a differential pressure corresponding to the target speed ratio is generated between a primary pulley pressure and a secondary pulley pressure.

In JP2004-100736A, when controlling a line pressure which serves as the source pressure of a primary pulley pressure and a secondary pulley pressure of a continuously variable transmission, a deviation in the actual step count of a step motor, occurring due to an error in the attachment of the step motor or the like, is calculated during driving as a learned value (starting learned value), and the line pressure is controlled taking the learned value into consideration, whereby an excessive or insufficient line pressure caused by an error in the attachment of the step motor or the like is corrected. Further, if a step motor control deviation, which is a deviation between the step count of the step motor corresponding to a target speed ratio and the step count of the step motor corresponding to the actual speed ratio, is large when performing steady state traveling with a set learned value, the learned value is recalculated and updated.

SUMMARY OF THE INVENTION

However, when the engine torque varies dramatically in the prior art described above, for example when the throttle position switches from a fully open to a fully closed state or from a fully closed to a fully open state, and control is performed to reduce the amount of variation in the target speed ratio, deviation between the target speed ratio and the actual speed ratio, which is caused to vary by the variation in the engine torque, increases, or in other words the step motor control deviation increases, and as a result, a learning error determination indicating that the current learned value must be updated is made even in conditions which do not require updating of the learned value.

When the learned value is determined to be erroneous, correction is performed to raise the line pressure in order to prevent insufficient line pressure until the conditions for recalculating the learned value are satisfied. As a result, the line pressure is high until the conditions for calculating the learned value are satisfied, and this increase in line pressure leads to deterioration in the fuel economy.

This invention has been designed to solve these problems, and it is an object thereof to prevent determination errors in a learning error determination, which may occur when the engine torque varies dramatically, thereby reducing the frequency with which the line pressure is raised and improving the fuel economy.

In order to achieve above the object, this invention provides a continuously variable transmission. The transmission comprises an input side primary pulley having a groove width which varies according to an oil pressure, an output side secondary pulley having a groove width which varies according to an oil pressure, a belt wrapped around the primary pulley and the secondary pulley, a pulley-contacting radius of which varies according to the groove width, an actuator which varies the oil pressure of the primary pulley according to a driving condition, and a controller.

The controller calculates a control deviation of the actuator on the basis of a reference model operating position, which is an operating position of the actuator corresponding to a target speed ratio, an actual operating position of the actuator corresponding to an actual speed ratio between the primary pulley and the secondary pulley, and an operating position deviation amount of the actuator, determines whether or not to update the operating position deviation amount of the actuator on the basis of a variation in the target speed ratio and the control deviation, updates the operating position deviation amount of the actuator on the basis of a deviation between the reference model operating position and the actual operating position when the operating position deviation amount of the actuator is determined to update, controls a line pressure, which serves as a source pressure of the oil pressure of the primary pulley and the oil pressure of the secondary pulley, on the basis of the control deviation, calculates a primary pulley input torque, and prohibits the determination of the update for a second predetermined time period when the primary pulley input torque varies beyond a range of a first predetermined value and a second predetermined value, which is smaller than the first predetermined value, during a first predetermined time period.

According to this invention, the determination as to whether or not to update the operating position deviation amount of the actuator, occurring when the primary input torque varies dramatically, can be made accurately, and hence unnecessary increases in the line pressure can be prevented and the fuel economy can be improved.

The details as well as other features and advantages of this invention are set forth in the remainder of the specification and are shown in the accompanying drawings.

DETAILED DESCRIPTION OF THE PREFERRED EMBODIMENT

Figure 1:
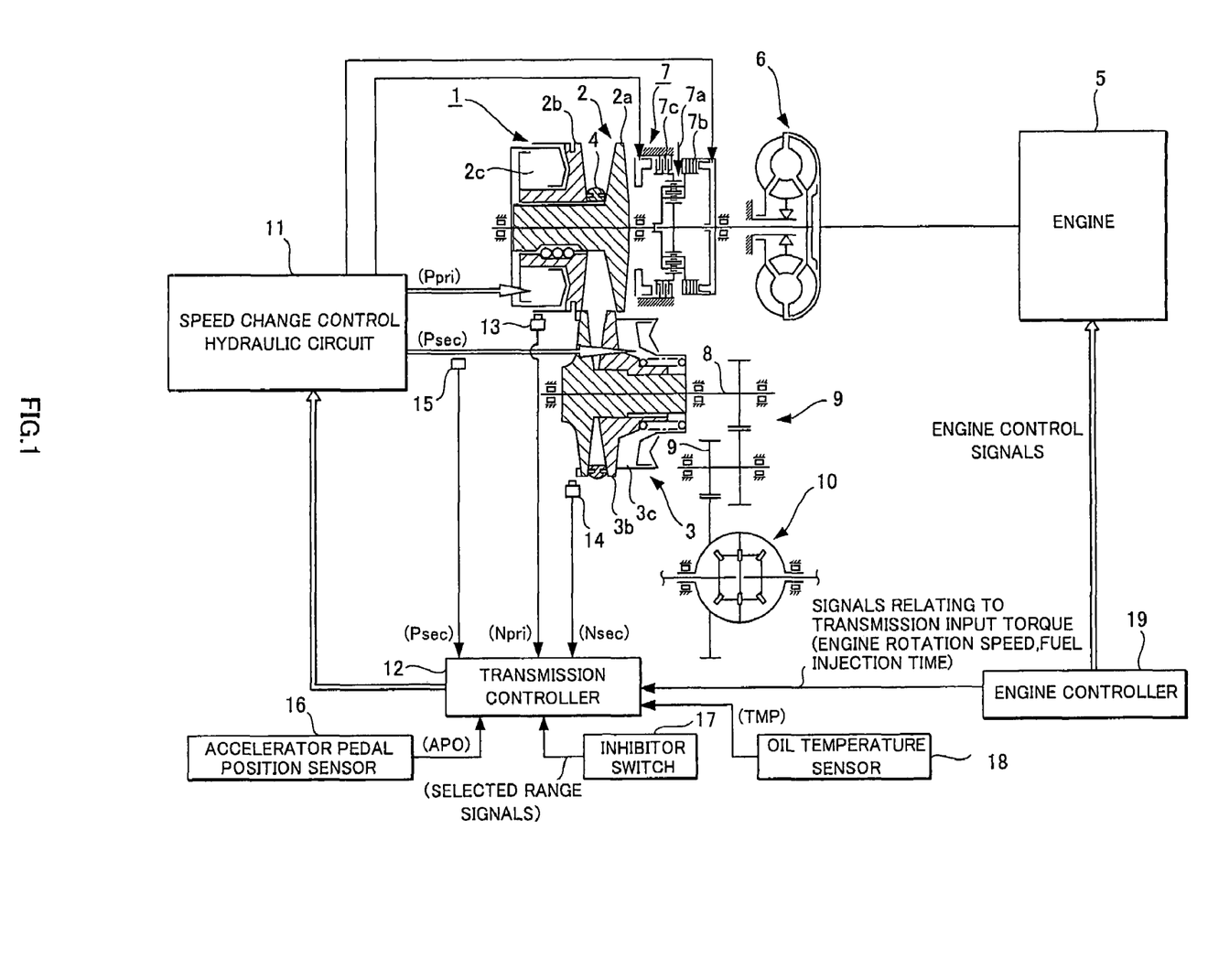
FIG. 1 is a schematic diagram of a continuously variable transmission according to an embodiment of this invention.

An embodiment of this invention will be described in detail below on the basis of the drawings. FIG. 1 shows an outline of a V belt continuously variable transmission 1. The V belt continuously variable transmission comprises a primary pulley 2 and a secondary pulley 3 arranged such that the V grooves of the two are aligned, and a V belt (belt) 4 which is wrapped around the V grooves of the pulleys 2, 3. An engine 5 is disposed coaxial with the primary pulley 2, and a torque converter 6 comprising a lockup clutch and a forward-reverse switching mechanism 7 are provided between the engine 5 and primary pulley 2 in succession from the engine 5 side.

The forward-reverse switching mechanism 7 comprises a double pinion planetary gear set 7a as a principal constitutional element, the sun gear thereof being joined to the engine 5 via the torque converter 6 and the carrier thereof being joined to the primary pulley 2. The forward-reverse switching mechanism 7 further comprises a forward clutch 7b which is directly coupled between the sun gear and carrier of the double pinion planetary gear set 7a, and a reverse brake 7c which fixes a ring gear. When the forward clutch 7b is engaged, an input rotation input from the engine 5 via the torque converter 6 is transmitted to the primary pulley 2 as is, and when the reverse brake 7c is engaged, the input rotation input from the engine 5 via the torque converter 6 is reversed and transmitted to the secondary pulley 2.

The rotation of the primary pulley 2 is transmitted to the secondary pulley 3 via the V belt 4, and the rotation of the secondary pulley 3 is transmitted thereafter to a vehicle wheel, not shown in the drawing, via an output shaft 8, a gear set 9, and a differential gear device 10.

To make a rotation transmission ratio (speed ratio) between the primary pulley 2 and secondary pulley 3 variable during this power transmission, the conical plates forming the respective V grooves of the primary pulley 2 and secondary pulley 3 are divided into fixed conical plates 2a, 3a, and movable conical plates 2b, 3b which are capable of axial displacement. The movable conical plates 2b, 3b are biased toward the fixed conical plates 2a, 3a through the supply of a primary pulley pressure Ppri and a secondary pulley pressure Psec, which are generated using a line pressure as a source pressure, to a primary pulley chamber 2c and a secondary pulley chamber 3c. As a result, the V belt 4 is caused to frictionally engage with the conical plates such that power transmission between the primary pulley 2 and secondary pulley 3 is performed.

During a speed change, the V groove width of the two pulleys 2, 3 is varied by the differential pressure between the primary pulley pressure Ppri and secondary pulley pressure Psec, which are generated in accordance with a target speed ratio I (o), and by continuously varying the wrapped arc diameter of the V belt 4 relative to the pulleys 2, 3, the target speed ratio I (o) is realized.

The primary pulley pressure Ppri and secondary pulley pressure Psec are controlled by a speed change control hydraulic circuit 11 together with the output of an engagement oil pressure of the forward clutch 7b, which is engaged when a forward traveling range is selected, and an engagement oil pressure of the reverse brake 7c, which is engaged when a reverse traveling range is selected. The speed change control hydraulic circuit 11 performs control in response to a signal from a transmission controller 12.

Signals from a primary pulley rotation sensor 13 which detects a primary pulley rotation speed Npri, signals from a secondary pulley rotation sensor 14 which detects a secondary pulley rotation speed Nsec, signals from a secondary pulley pressure sensor 15 which detects the secondary pulley pressure Psec, signals from an accelerator pedal position sensor 16 which detects an accelerator pedal position APO, selected range signals from an inhibitor switch 17, signals from an oil temperature sensor 18 which detects a speed change hydraulic fluid temperature TMP, and signals (engine rotation speed and fuel injection time) relating to a transmission input torque Ti from an engine controller 19 which controls the engine 5, are input into the transmission controller 12.

Figure 2:
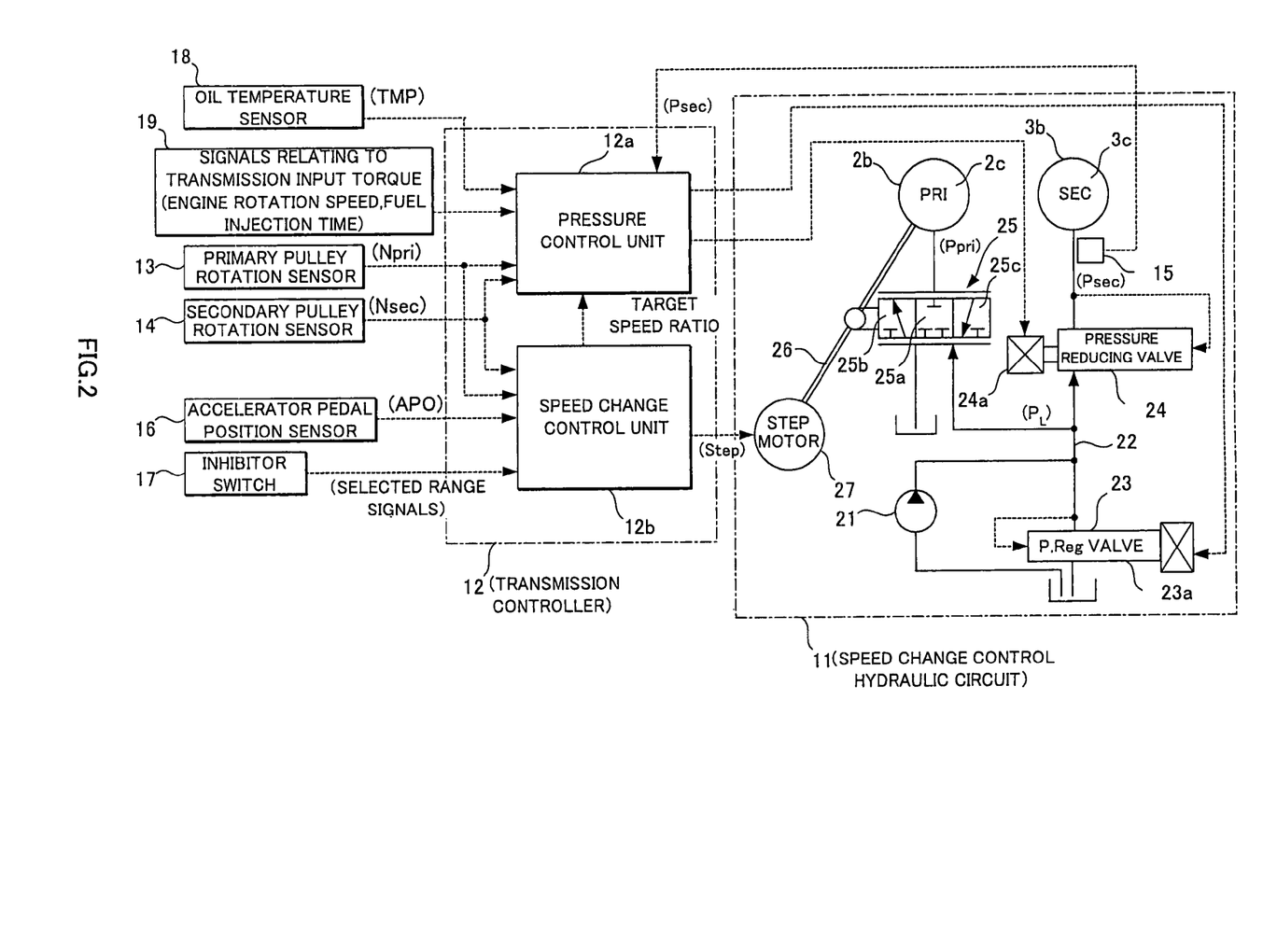
FIG. 2 is a schematic diagram of a speed change control hydraulic circuit and a transmission controller according to an embodiment of this invention.

Next, the speed change control hydraulic circuit 11 and transmission controller 12 will be described using the schematic diagram in FIG. 2. First, the speed change control hydraulic circuit 11 will be described.

The speed change control hydraulic circuit 11 comprises an engine-driven oil pump 21, and the pressure of a hydraulic fluid supplied to an oil passage 22 by the oil pump 21 is regulated to a predetermined line pressure PL by a pressure regulator valve 23. The pressure regulator valve 23 controls the line pressure PL in accordance with a drive duty input into a solenoid 23a.

The line pressure PL in the oil passage 22 is adjusted by a pressure reducing valve 24 and supplied to the secondary pulley chamber 3c as the secondary pulley pressure Psec on the one hand, and adjusted by a speed change control valve 25 and supplied to the primary pulley chamber 2c as the primary pulley pressure Ppri on the other hand. The pressure reducing valve 24 controls the secondary pulley pressure Psec in accordance with a drive duty input into a solenoid 24a.

The speed change control valve 25 comprises a neutral position 25a, a pressure increasing position 25b, and a pressure reducing position 25c, and to switch between these valve positions, the speed control valve 25 is connected to the middle of a speed change link 26. The speed change link 26 is connected to a step motor 27 serving as a speed change actuator at one end thereof, and to the movable conical plate 2b of the primary pulley 2 at the other end thereof.

The step motor 27 is set in an operating position which is advanced from a reference position by a step count Step corresponding to the target speed ratio I (o), and through the operation of the step motor 27, the speed change link 26 swings using a connecting portion with the movable conical plate 2b as a fulcrum. As a result, the speed change control valve 25 is moved from the neutral position 25a to the pressure increasing position 25b or the pressure reducing position 25c. Hence, the primary pulley pressure Ppri is increased using the line pressure PL as a source pressure or decreased through a drain, and thus the differential pressure between the primary pulley pressure Ppri and secondary pulley pressure Psec is varied so as to generate an upshift to a High side speed ratio or a downshift to a Low side speed ratio. Accordingly, a speed change following the target speed ratio I (o) is performed.

The speed change advancement is fed back to the corresponding end of the speed change link 26 via the movable conical plate 2b of the primary pulley 2, and the speed change link 26 swings about a connecting portion with the step motor 27 in a direction which returns the speed change control valve 25 from the pressure increasing position 25b or the pressure reducing position 25c to the neutral position 25a. Hence, when the target speed ratio I (o) is reached, the speed change control valve 25 is returned to the neutral position 25a so that the target speed ratio I (o) can be maintained.

The solenoid drive duty of the pressure regulator valve 23, the solenoid drive duty of the pressure reducing valve 24, and a speed change command (step count) input into the step motor 27 are controlled by the transmission controller 12. The transmission controller 12 also performs control to determine whether or not to supply the engagement oil pressure to the forward clutch 7b and reverse brake 7c shown in FIG. 1. The transmission controller 12 is constituted by a pressure control unit (line pressure control means) 12a and a speed change control unit 12b.

The speed change control unit 12b uses a vehicle speed TVO, determined from the secondary pulley rotation speed Nsec, and the accelerator pedal position APO to determine a target input rotation speed based on a preset speed change map. A theoretical speed ratio Ip corresponding to the driving conditions (the vehicle speed TVO and accelerator pedal position APO) is then determined by dividing the target input rotation speed by the secondary pulley rotation speed Nsec.

Next, an actual speed ratio ip is calculated by dividing the primary pulley rotation speed Npri by the secondary pulley rotation speed Nsec, and a deviation between the theoretical speed ratio Ip and the actual speed ratio ip is determined. The target speed ratio I (o) is then calculated by multiplying a first-order lag filter $\{1/(Tm \times s+1)\}$ taking account of a hardware response delay by a disturbance-compensated theoretical speed ratio I.

The pressure control unit 12a calculates a line pressure correction amount ΔP from a control deviation ΔStep, which is the deviation between a step count (reference model operating position) StepMdl of the step motor 27 corresponding to the target speed ratio I (o), and an added value obtained by adding a target deviation amount GTstep and a starting learned value (operating position deviation amount) Gstep to a step count (actual operating position) Bstep of the step motor 27 based on the actual speed ratio ip, and calculates a target line pressure PL* on the basis of the line pressure correction amount ΔP. The pressure control unit 12a then controls the line pressure PL by determining the solenoid drive duty of the pressure regulator valve 23.

Figure 3:
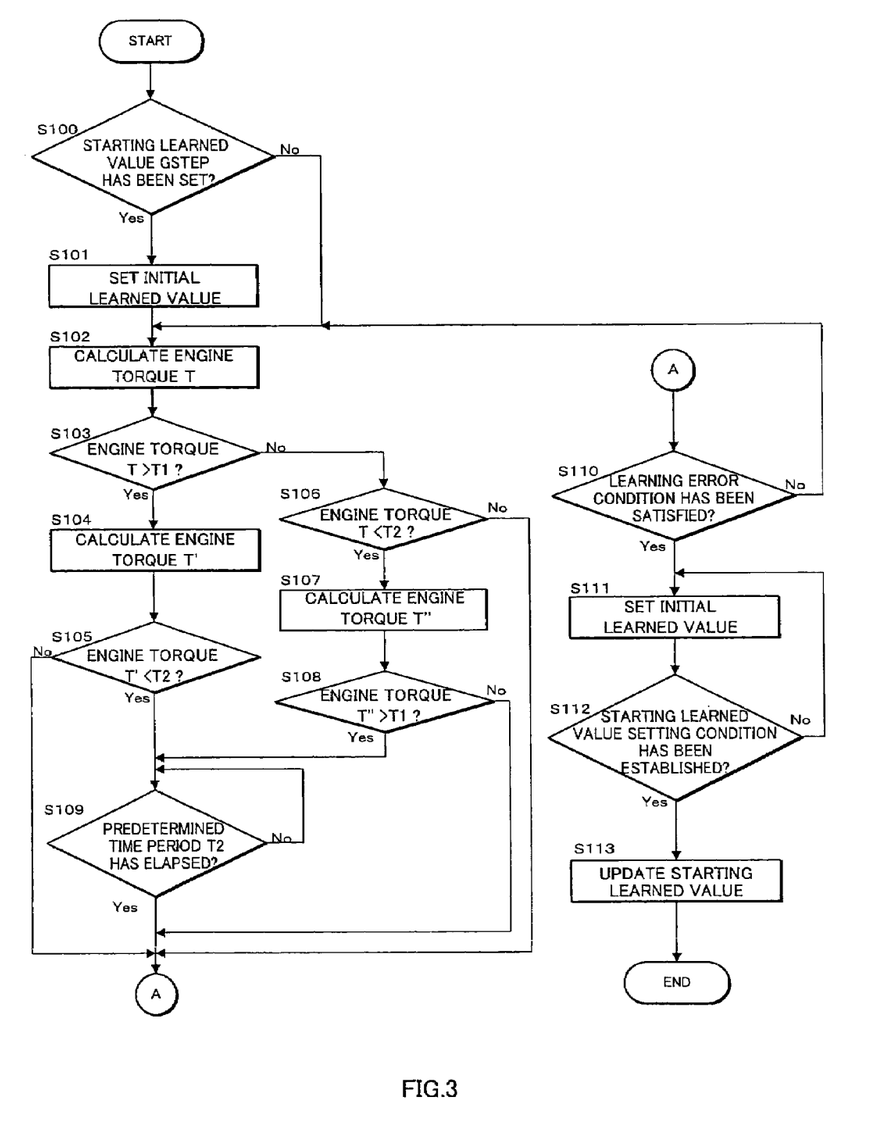
FIG. 3 is a flowchart showing a method of setting a starting learned value according to an embodiment of this invention.

Next, a method of setting the starting learned value Gstep will be described using the flowchart in FIG. 3.

In a step S100, a determination is made as to whether or not the starting learned value Gstep has been set. When the starting learned value Gstep has been set, the routine advances to a step S102, and when the starting learned value Gstep has not been set, the routine advances to a step S101.

In the step S101, an initial learned value is set as the starting learned value Gstep. The initial learned value is a predetermined value for keeping the line pressure PL high enough to prevent a reduction in the primary pulley pressure Ppri or secondary pulley pressure Psec leading to hunting or the like.

In the step S102, an engine torque (primary pulley input torque) T is calculated on the basis of the engine rotation speed and fuel injection time obtained from the engine controller 19 (see FIG. 1). It should be noted that instead of the engine torque, a transmission input torque, which is calculated by multiplying the engine torque by an amplification factor of the torque converter 6, may be used (likewise hereafter) (the step S102 constitutes primary pulley input torque calculating means).

In a step S103, the engine torque T calculated in the step S102 is compared with a predetermined value (first predetermined value) T1, and when the engine torque T is larger than the predetermined value T1, the routine advances to a step S104. The predetermined value T1 is the engine torque at a preset, comparatively high load, for example when the accelerator pedal position APO reaches a maximum, and in this embodiment corresponds to 120 Nm.

In a step S104, an engine torque T' is calculated on the basis of the engine rotation speed and fuel injection time from the engine controller 19 following the elapse of a predetermined time period (first predetermined time period) t1. The predetermined time period t1 is a preset time period which in this embodiment corresponds to one second.

In a step S105, the engine torque T' calculated in the step S104 is compared with a predetermined value (second predetermined value) T2. When the engine torque T' is smaller than the predetermined value T2, the routine advances to a step S109, and when the engine torque T' is larger than the predetermined value T2, the routine advances to a step S110. The predetermined value T2 is a preset value which is smaller than the predetermined value T1, and corresponds to the engine torque at a comparatively low load, for example when the accelerator pedal position APO is substantially zero. In this embodiment, the predetermined value T2 is set at 50 Nm.

If, on the other hand, the engine torque T calculated in the step S102 is smaller than the predetermined value T1, the engine torque T is compared to the predetermined value T2 in a step S106. When the engine torque T is smaller than the predetermined value T2, the routine advances to a step S107, and when the engine torque T is larger than the predetermined value T2, the routine advances to the step S110. In other words, when the engine torque T corresponds to $T1 \leq T \leq T2$, it is determined that a dramatic variation in the engine torque T has not occurred, and the routine advances to the step S110.

In the step S107, an engine torque T" is calculated on the basis of the engine rotation speed and fuel injection time from the engine controller 19 following the elapse of the predetermined time period t1.

In a step S108, the engine torque T" calculated in the step S107 is compared with the predetermined value T1. When the engine torque T" is larger than the predetermined value T1, the routine advances to the step S109, and when the engine torque T" is smaller than the predetermined value T1, the routine advances to the step S110.

When it is determined that the engine torque T' is smaller than the predetermined value T2 in the step S105 or that the engine torque T" is larger than the predetermined value T1 in the step S108, it is determined that the engine torque has varied beyond the range of the predetermined value T1 and the predetermined value T2 within the predetermined time period t1, and hence that the engine torque has varied dramatically. In this case, the routine advances to the step S109.

On the other hand, when it is determined that the engine torque T' is larger than the predetermined value T2 in the step S105 or that the engine torque T" is smaller than the predetermined value T1 in the step S108, it is determined that the engine torque has not varied dramatically, and the routine advances to the step S110.

In the step S109, a determination is made as to whether or not a predetermined time period (second predetermined time period) t2 has elapsed following the step S105 or the step S108. Once the predetermined time period t2 has elapsed, the routine advances to the step S110 (processing from the step S103 to the step S109 constitutes determination prohibiting means).

In the step S10, a determination is made as to whether or not a learning error condition has been satisfied. When the learning error condition has been satisfied, the routine advances to a step S111, and when the learning error condition has not been satisfied, the current starting learned value Gstep is maintained and the routine returns to the step S102, where the control described above is repeated (the step S10 constitutes determining means).

The learning error condition is a condition whereby a state in which the absolute value of a temporal rate of change (variation) DI (o) in the target speed ratio I (o) is equal to or less than a predetermined value (first predetermined value) DI (o) 1 (for example, $|DI (o)| \leq 0.05$) and the absolute value of the control deviation ΔStep is equal to or greater than a predetermined deviation (second predetermined value) ΔStep 1 (for example, $|\Delta Step| \geq 6 step$) continues for a predetermined time period (third predetermined time period) t3 (for example, one second) or more. It should be noted that the predetermined deviation ΔStep 1 may be modified according to the sign of the control deviation ΔStep (for example, ΔStep≧6step or ΔStep≦−10step).

When the engine torque varies dramatically, the actual speed ratio ip varies dramatically in accordance therewith, and hence the deviation between the target speed ratio I (o) and actual speed ratio ip increases, leading to an increase in the absolute value of the control deviation ΔStep. Therefore, when the learning error determination is performed in relation to the starting learned value Gstep in the step S110 immediately after a dramatic variation in the engine torque, the current starting learned value Gstep may be determined as a learning error, i.e. an erroneous value, even when the starting learned value Gstep is not erroneous and does not need to be updated.

Here, when it is determined in the step S105 or the step S108 that the engine torque has varied dramatically, the predetermined time period t2 is allowed to elapse, and advancement to the learning error determination that is performed in relation to the starting learned value Gstep in the step S10 is halted (prohibited) until the deviation between the target speed ratio I (o) and the actual speed ratio ip, caused by the dramatic variation in the engine torque, has decreased. The predetermined time period t2 is set in advance through experiment or the like to a time period in which the deviation between the target speed ratio I (o) and the actual speed ratio ip can decrease sufficiently following a dramatic variation in the engine torque, or in other words a time period in which the actual speed ratio ip can follow the target speed ratio I (o) and the absolute value of the control deviation ΔStep can decrease sufficiently. Here, the predetermined time period t2 is set at three seconds.

According to the control described above, when the engine torque varies beyond the range of the predetermined value T1 and the predetermined value T2 during the predetermined time period t1, advancement to the learning error determination performed in relation to the starting learned value Gstep in the step S110 is halted for the duration of the subsequent predetermined time period t2. As a result, determination errors in the learning error determination that may occur until the actual speed ratio ip, which is changed by the dramatic variation in the engine torque, follows the target speed ratio I (o) can be eliminated when the accelerator pedal position APO is operated suddenly, for example. In other words, the learning error determination can be performed accurately.

When it is determined in the step S110 that the learning error condition has been satisfied and that the current starting learned value Gstep is an erroneous value, the starting learned value Gstep is set at the preset initial learned value in the step S111. In so doing, a deficiency in the line pressure PL can be prevented.

In a step S112, a determination is made as to whether or not a starting learned value setting condition has been established. When the starting learned value setting condition has been established, the routine advances to a step S113, and when the starting learned value setting condition has not been established, the initial learned value is maintained as the starting learned value Gstep until the starting learned value setting condition is established.

The learned value setting condition is a condition whereby a state in which the line pressure PL is set sufficiently high, the target speed ratio I (o) is at a maximum Hi, the actual step count of the step motor 27 is unchanged, i.e. the actual speed ratio ip is constant, and the accelerator pedal position APO is small continues for a predetermined time period (two seconds, for example).

In the step S113, when the starting learned value setting condition is established, the deviation between the step count StepMdl of the step motor 27 corresponding to the current target speed ratio I (o) and the step count Bstep of the step motor 27 corresponding to the actual speed ratio ip is calculated, and the calculated deviation is updated as the starting learned value Gstep (the routine from the step S110 to the step S113 constitutes updating means).

When the starting learned value setting condition is established, the target speed ratio I (o) is at the maximum High, the actual speed ratio ip is constant, and the accelerator pedal position is small, the deviation between the step count StepMdl of the step motor 27 corresponding to the target speed ratio I (o) and the step count Bstep of the step motor 27 corresponding to the actual speed ratio ip substantially matches that of a case in which no deviation occurs due to an error in the attachment of the step motor 27 or the like. Hence, when the starting learned value setting condition is satisfied, the deviation between the step count StepMdl of the step motor 27 corresponding to the target speed ratio I (o) and the step count Bstep of the step motor 27 corresponding to the actual speed ratio ip is set at the starting learned value Gstep corresponding to deviation occurring due to an error in the attachment of the step motor 27 or the like.

According to the control described above, when the engine torque varies beyond the range of the predetermined value T1 and the predetermined value T2 during the predetermined time period t1, advancement to the learning error determination is halted for the duration of the predetermined time period t2. In so doing, determination errors occurring in the learning error determination following a dramatic variation in the engine torque can be prevented. When the learning error determination is performed, the starting learned value Gstep is set to the initial learned value until the starting learned value Gstep is relearned and reset, and this leads to an increase in the line pressure PL. However, in this embodiment, the learning error determination is performed accurately in relation to the starting learned value Gstep, and therefore the frequency with which the starting learned value Gstep is set at the initial learned value can be reduced, enabling an improvement in fuel economy.

Figure 4:
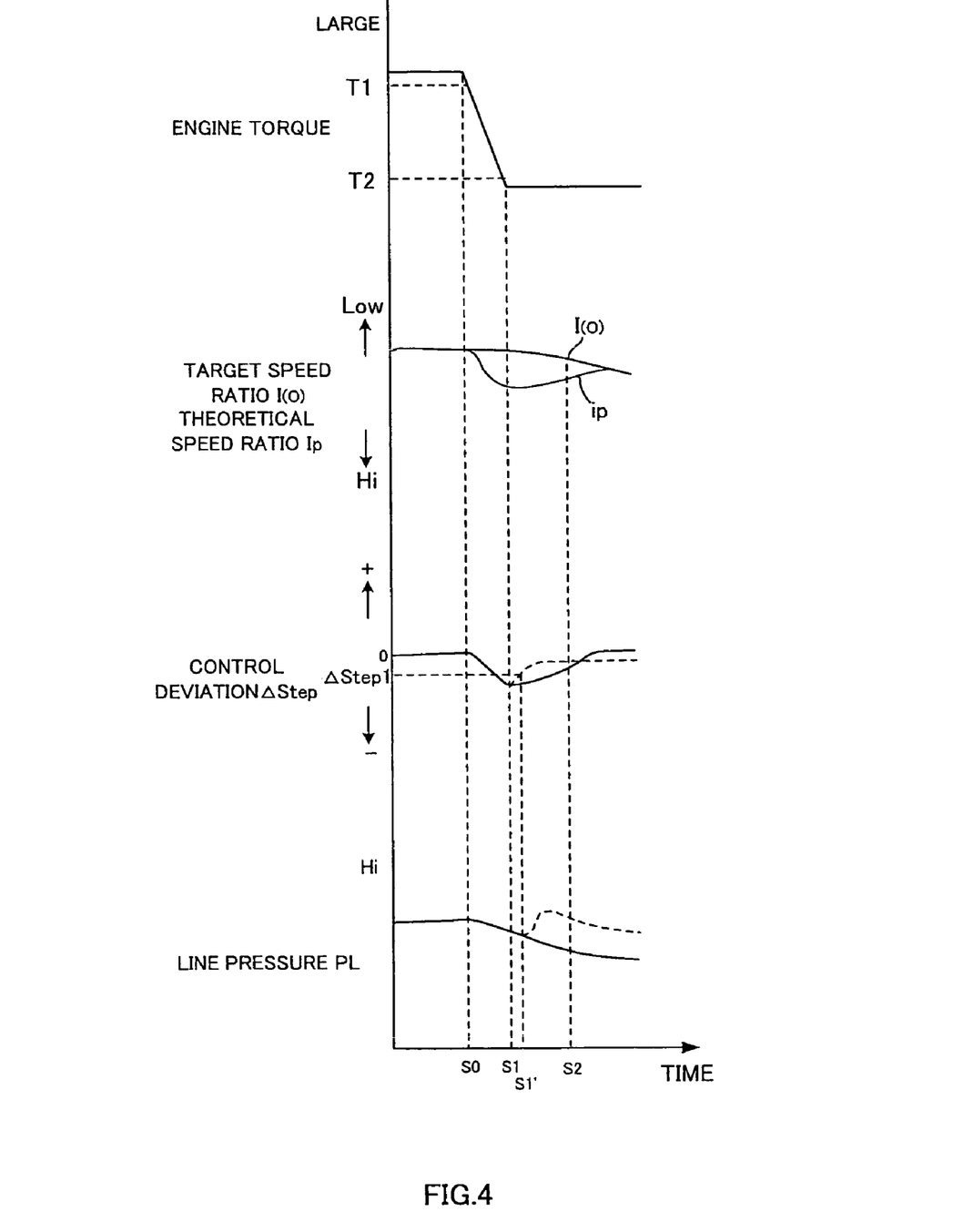
FIG. 4 is a time chart showing variation in an engine torque, a target speed ratio, an actual speed ratio, a control deviation, and a line pressure, according to an embodiment of this invention.

Next, variation in the engine torque, target speed ratio I (o), actual speed ratio ip, and line pressure PL will be described using the time chart in FIG. 4. FIG. 4 shows variation in the engine torque, target speed ratio I (o), actual speed ratio ip, and line pressure PL when the accelerator pedal position changes from maximum to zero.

It is assumed here that prior to a time s0, the accelerator pedal position APO has been set at a maximum by a driver and the engine torque is greater than the predetermined value T1.

When the accelerator pedal position APO reaches zero at the time s0, the engine torque decreases. As the engine torque decreases, the actual speed ratio ip shifts to the High side. Meanwhile, variation in the target speed ratio I (o) is small (the variation DI (o) in the target speed ratio I (o)≦0.05), and therefore the deviation between the target speed ratio I (o) and actual speed ratio ip increases. In other words, the absolute value of the control deviation ΔStep increases.

In a case where this invention is not used, the absolute value of the control deviation ΔStep increases beyond the predetermined deviation ΔStep 1 when the learning error determination is performed at a time s1' immediately after a dramatic variation in the engine torque, and hence the learning error condition is satisfied. As a result, the current starting learned value Gstep is determined to be erroneous, and the starting learned value Gstep is updated to the initial learned value.

Accordingly, the line pressure PL rises (broken line in FIG. 4) and the fuel economy worsens.

In this embodiment, on the other hand, the engine torque is lower than the predetermined value T2 at a time s1 which is reached following the elapse of the predetermined time period t1 from the time s0, and hence advancement to the learning error determination is halted throughout the predetermined time period t2. The actual speed ratio ip which shifted to the High side follows the target speed ratio I (o) over time, and hence the absolute value of the control deviation ΔStep also decreases gradually.

The learning error determination is performed at a time s2 which is reached following the elapse of the predetermined time period t2 from the time s1. In this embodiment, advancement to the learning error determination is halted from the time s1 for the duration of the predetermined time period t2, and hence the absolute value of the control deviation ΔStep is smaller than the predetermined deviation ΔStep 1 such that the learning error determination condition is not satisfied and the current starting learned value Gstep is maintained.

As described above, when the engine torque varies dramatically in this embodiment, determination errors indicating that the current starting learned value Gstep is erroneous even though the current starting learned value Gstep is not erroneous can be prevented from occurring during the learning error determination, enabling a reduction in the frequency with which the line pressure PL increases and an improvement in fuel economy.

The effects of this invention will now be described.

In this embodiment, when the line pressure PL, which serves as the source pressure of the primary pulley 2 and secondary pulley 3, is controlled on the basis of the control deviation ΔStep, which is the deviation between the step count StepMdl of the step motor 27 corresponding to the target speed ratio I (o) and a value obtained by adding the target deviation GTstep and the starting learned value Gstep to the step count Bstep of the step motor 27 corresponding to the actual speed ratio ip, the engine torque varies beyond the range of the predetermined value T I and the predetermined value T2 during the predetermined time period t1, advancement to a learning error determination for determining whether or not to update the starting learned value Gstep on the basis of the variation DI (o) in the target speed ratio I (o) and the control deviation ΔStep is prohibited for the predetermined time period t2. In so doing, the learning error determination can be performed accurately when the engine torque varies dramatically. When a learning error is determined, the starting learned value Gstep is temporarily set at an initial learned value which causes an increase in the line pressure PL, and as a result, the line pressure PL increases and the fuel economy deteriorates. However, in this embodiment, the learning error determination is performed accurately, and therefore the frequency with which the starting learned value Gstep is set at the initial learned value can be reduced. Thus, unnecessary increases in the line pressure PL can be prevented and the fuel economy can be improved.

This invention is not limited to the embodiment described above, and includes various modifications and improvements within the technical scope thereof.

This application claims priority from Japanese Patent Application 2005-290911, filed Oct. 4, 2005, which is incorporated herein by reference in its entirety.

What is claimed is:

1. A continuously variable transmission comprising:
an input side primary pulley having a groove width which varies according to an oil pressure;
an output side secondary pulley having a groove width which varies according to an oil pressure;
a belt wrapped around the primary pulley and the secondary pulley, a pulley-contacting radius of which varies according to the groove width;
an actuator which varies the oil pressure of the primary pulley according to a driving condition; and
a controller, which
calculates a control deviation of the actuator on the basis of a reference model operating position, which is an operating position of the actuator corresponding to a target speed ratio, an actual operating position of the actuator corresponding to an actual speed ratio between the primary pulley and the secondary pulley, and an operating position deviation amount of the actuator;
determines whether or not to update the operating position deviation amount of the actuator on the basis of a variation in the target speed ratio and the control deviation;
updates the operating position deviation amount of the actuator on the basis of a deviation between the reference model operating position and the actual operating position when the operating position deviation amount of the actuator is determined to update;
controls a line pressure, which serves as a source pressure of the oil pressure of the primary pulley and the oil pressure of the secondary pulley, on the basis of the control deviation;
calculates a primary pulley input torque; and
prohibits the determination of the update for a second predetermined time period when the primary pulley input torque varies beyond a range of a first predetermined value and a second predetermined value, which is smaller than the first predetermined value, during a first predetermined time period.

2. The continuously variable transmission as defined in claim 1, wherein the controller determines to update the operating position deviation amount of the actuator when a state in which an absolute value of the variation in the target speed ratio is smaller than a first predetermined value and an absolute value of the control deviation is larger than a second predetermined value continues for a third predetermined time period.

3. A control method for a continuously variable transmission, the transmission comprising:
an input side primary pulley having a groove width which varies according to an oil pressure;
an output side secondary pulley having a groove width which varies according to an oil pressure;
a belt wrapped around the primary pulley and the secondary pulley, a pulley-contacting radius of which varies according to the groove width; and
an actuator which varies the oil pressure of the primary pulley according to a driving condition; and
the method comprising:
calculating a control deviation of the actuator on the basis of a reference model operating position, which is an operating position of the actuator corresponding to a target speed ratio, an actual operating position of the actuator corresponding to an actual speed ratio between the primary pulley and the secondary pulley, and an operating position deviation amount of the actuator;
determining whether or not to update the operating position deviation amount of the actuator on the basis of a variation in the target speed ratio and the control deviation;

updating the operating position deviation amount of the actuator on the basis of a deviation between the reference model operating position and the actual operating position when the operating position deviation amount of the actuator is determined to update;

controlling a line pressure, which serves as a source pressure of the oil pressure of the primary pulley and the oil pressure of the secondary pulley, on the basis of the control deviation;

calculating a primary pulley input torque; and prohibiting the determination of the update for a second predetermined time period when the primary pulley input torque varies beyond a range of a first predetermined value and a second predetermined value, which is smaller than the first predetermined value, during a first predetermined time period.

4. The control method as defined in claim 3, wherein the determining to update the operating position deviation amount of the actuator is performed when a state in which an absolute value of the variation in the target speed ratio is smaller than a first predetermined value and an absolute value of the control deviation is larger than a second predetermined value continues for a third predetermined time period.

5. A continuously variable transmission comprising:

an input side primary pulley having a groove width which varies according to an oil pressure;

an output side secondary pulley having a groove width which varies according to an oil pressure;

a belt wrapped around the primary pulley and the secondary pulley, a pulley-contacting radius of which varies according to the groove width; and an actuator which varies the oil pressure of the primary pulley according to a driving condition; and means for calculating a control deviation of the actuator on the basis of a reference model operating position, which is an operating position of the actuator corresponding to a target speed ratio, an actual operating position of the actuator corresponding to an actual speed ratio between the primary pulley and the secondary pulley, and an operating position deviation amount of the actuator;

means for determining whether or not to update the operating position deviation amount of the actuator on the basis of a variation in the target speed ratio and the control deviation;

means for updating the operating position deviation amount of the actuator on the basis of a deviation between the reference model operating position and the actual operating position when the operating position deviation amount of the actuator is determined to update;

means for controlling a line pressure, which serves as a source pressure of the oil pressure of the primary pulley and the oil pressure of the secondary pulley, on the basis of the control deviation;

means for calculating a primary pulley input torque; and means for prohibiting the determination of the update for a second predetermined time period when the primary pulley input torque varies beyond a range of a first predetermined value and a second predetermined value, which is smaller than the first predetermined value, during a first predetermined time period.

6. The continuously variable transmission as defined in claim 5, wherein the means for determining determines to update the operating position deviation amount of the actuator when a state in which an absolute value of the variation in the target speed ratio is smaller than a first predetermined value and an absolute value of the control deviation is larger than a second predetermined value continues for a third predetermined time period.

* * * * *